US012581173B2

(12) United States Patent
Xu et al.

(10) Patent No.: US 12,581,173 B2
(45) Date of Patent: Mar. 17, 2026

(54) METHODS AND SYSTEMS FOR RESUMPTION OF A MEDIA CONTENT ITEM

(71) Applicant: Adeia Guides Inc., San Jose, CA (US)

(72) Inventors: Ning Xu, Irvine, CA (US); Jean-Yves Couleaud, Mission Viejo, CA (US); Tao Chen, Palo Alto, CA (US); Dhananjay Lal, Englewood, CO (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/539,831

(22) Filed: Dec. 14, 2023

(65) Prior Publication Data

US 2025/0203177 A1     Jun. 19, 2025

(51) Int. Cl.
*H04N 7/16*          (2011.01)
*H04N 21/442*        (2011.01)
*H04N 21/472*        (2011.01)
*H04N 21/8549*       (2011.01)

(52) U.S. Cl.
CPC ... *H04N 21/8549* (2013.01); *H04N 21/44204* (2013.01); *H04N 21/47217* (2013.01)

(58) Field of Classification Search
CPC ......... H04N 21/8549; H04N 21/44204; H04N 21/47217
USPC .......................................................... 725/14
See application file for complete search history.

(56) References Cited

U.S. PATENT DOCUMENTS 8,386,935 B2 * 2/2013 van Zwol ........... G06F 3/04817
                                                              715/723
9,445,163 B2 * 9/2016 Card, II ............. H04N 21/6582

10,455,297 B1 * 10/2019 Mahyar .............. H04N 21/4532
10,764,609 B2 * 9/2020 Watson ................ H04N 21/234
10,951,932 B1 * 3/2021 Ram .................... H04N 21/251
11,184,675 B1   11/2021 Aher et al.
11,451,885 B1 * 9/2022 Chandrashekar ..... G06F 40/166
2009/0183210 A1 * 7/2009 Andrade .......... H04N 21/44204
                                                              725/87
2015/0334472 A1 * 11/2015 Kishore ............ H04N 21/8549
                                                              725/32
2019/0272082 A1 * 9/2019 Johansson ........... G06F 3/04842
2020/0314480 A1   10/2020 Gupta et al.
2021/0352382 A1 * 11/2021 Channapragada ..........................
                                                              H04N 21/4312
2022/0272425 A1   8/2022 Puniyani et al.
2023/0016521 A1 * 1/2023 Dhiman ............. H04N 21/2747
2023/0024969 A1 * 1/2023 Chandrashekar .. H04N 21/4755
2023/0032959 A1 * 2/2023 Gupta ............. H04N 21/44218
2023/0291972 A1 * 9/2023 Panchaksharaiah ........................
                                                              H04N 21/2402
2024/0080515 A1 * 3/2024 Harb ................... H04N 21/4312
2024/0215881 A1 * 7/2024 Henderson ............. A61B 5/165

OTHER PUBLICATIONS

Wikipedia, "Forgetting curve", (https://en.wikipedia.org/wiki/Forgetting_curve), (2 pages).

* cited by examiner

*Primary Examiner* — Sahar Aqil Riaz

(74) *Attorney, Agent, or Firm* — HG LAW LLP

(57)          ABSTRACT

There are provided systems and methods for resuming a media content item. A user watch history of the media content item is determined. The user watch history comprises a pause point and a pause duration. A media content summary is determined based on the user watch history. The media content summary is generated for consumption by the user.

20 Claims, 11 Drawing Sheets

Figure 4A:
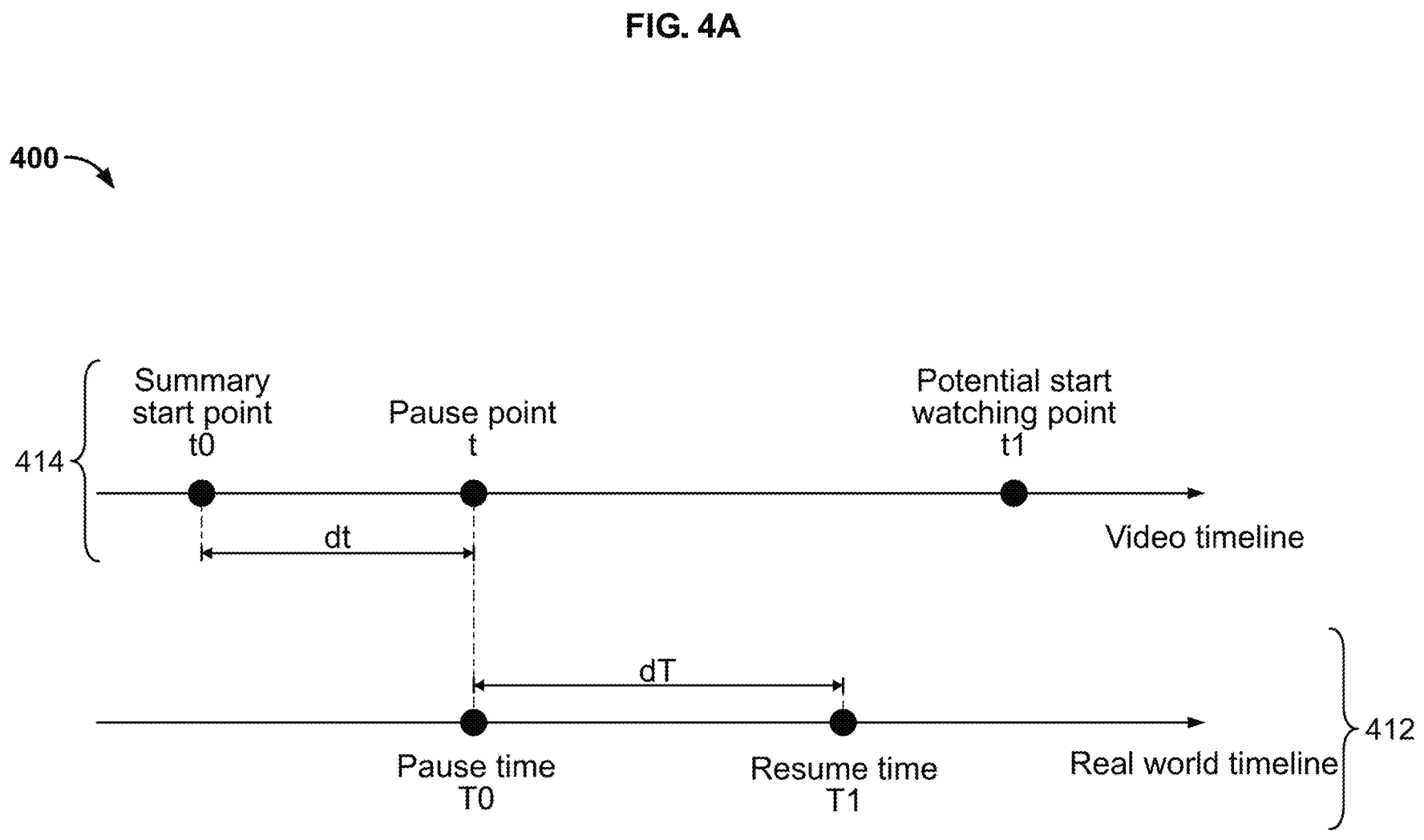

Summary start point
t0

Pause point
t dt

Potential start watching point
t1

Video timeline

412

Pause time
T0 dT

Resume time
T1

Real world timeline

500

Start

502 — Determine user watch history of the media content item, wherein the user watch history comprises a pause point and a pause duration 504 — Determine a media content summary based on the user watch history 506 — Generate the media content summary for consumption by the user

FIG. 6

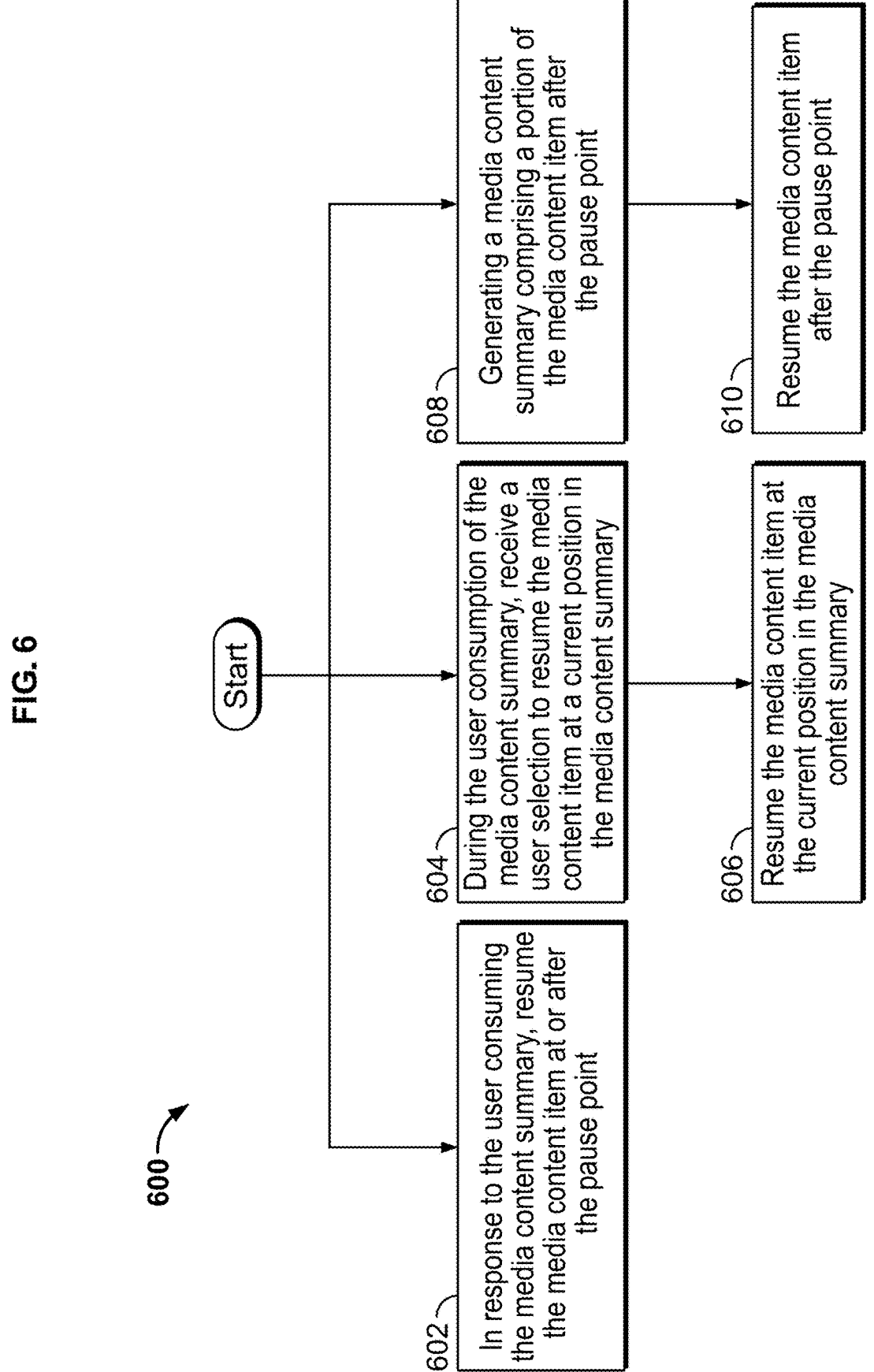

600

Start

602 — In response to the user consuming the media content summary, resume the media content item at or after the pause point 604 — During the user consumption of the media content summary, receive a user selection to resume the media content item at a current position in the media content summary 606 — Resume the media content item at the current position in the media content summary 608 — Generating a media content summary comprising a portion of the media content item after the pause point 610 — Resume the media content item after the pause point

Start

702 Determine a detail level of the media content summary based on the user watch history, wherein a length of the media content summary is based on the detail level 704 Determine a watch history of the media content by at least one second user of a plurality of users, wherein the watch history of the at least one second user comprises portions of the media content item that was skipped, wherein the media content summary is further based on the watch history of the at least one second user 708 Determine user preferences for the determination and generation of the media content summary; and wherein the media content summary is further based on the user preferences

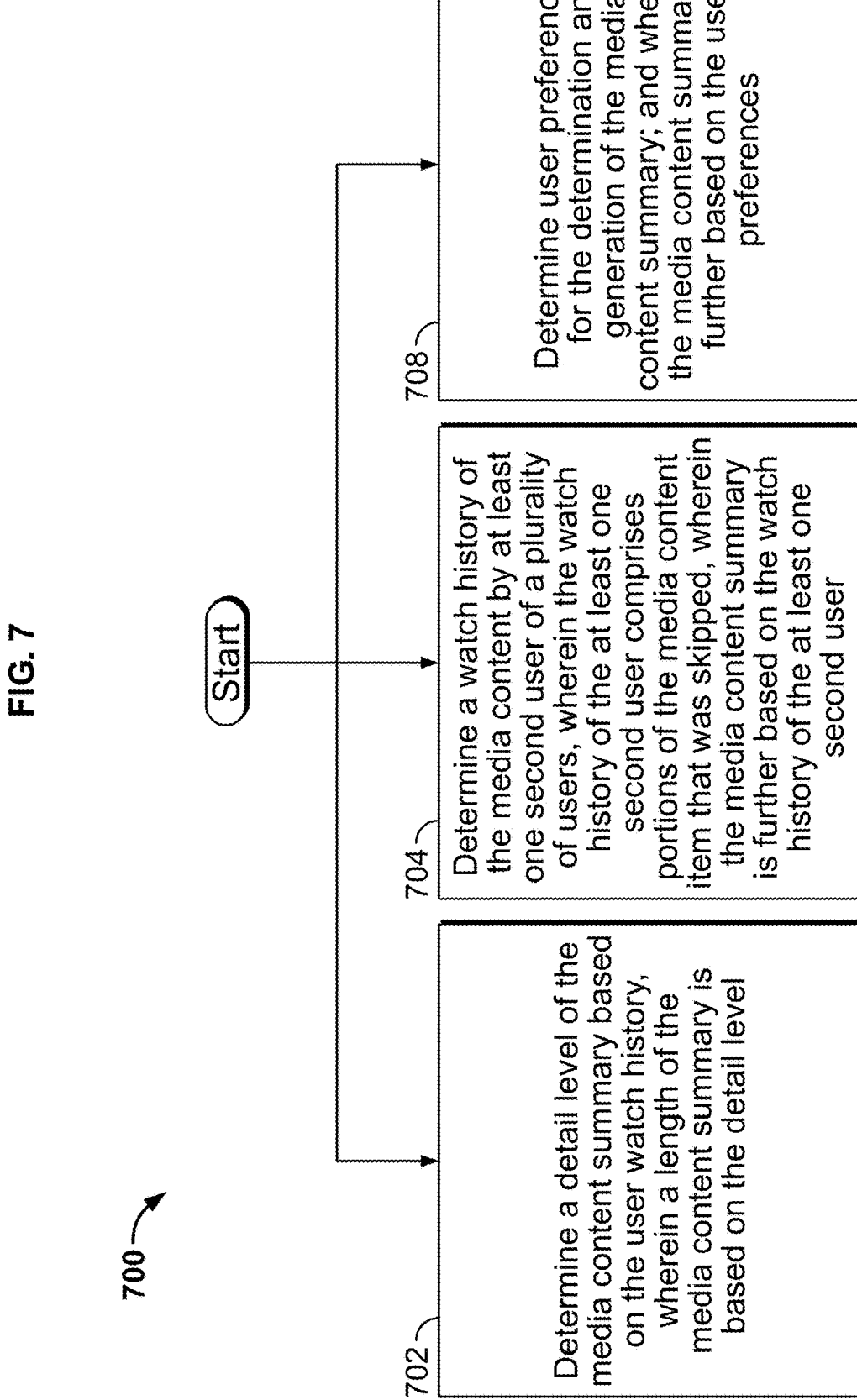

METHODS AND SYSTEMS FOR RESUMPTION OF A MEDIA CONTENT ITEM

BACKGROUND

The present disclosure relates to methods and systems for displaying content and, more particularly but not exclusively, to systems and related processes for resuming media content, such as video on demand (VOD), podcasts, eBooks, and the like, when accessing a media content service, such as an over-the-top (OTT) service.

SUMMARY

In the past few years, the number of people turning to the internet for news, entertainment, education, and more has increased exponentially. Most media platforms, OTT service providers, pay TV providers, and social media providers allow users to pause media content, such as video programs. When a video program is paused, it is frame frozen. Most players apply a basic effect, such as a brightness filter (e.g., "greying") to the frozen frame and overlay information such as date and time, program title, channel (if applicable), basic player controls, and/or information relating to an actor in the frozen frame. More recently, advertisements are being displayed during these pause events.

A problem arises where users interrupt their viewing sessions due to various reasons, such as time constraints, distractions, or other commitments. For example, when they wish to resume watching, e.g., by ending a pause event, they may face difficulties remembering the plot details or context, leading to a disjointed and less enjoyable viewing experience. In some cases, this can lead to a user ending a viewing session in order to refamiliarize themselves with plot details or context, e.g., by engaging in a chat session, searching for information online and/or by restarting the viewing session. Such actions can lead to an increased operational load of a user device and/or server, e.g., when performing operations guided at refamiliarizing a user with plot details or context of media content following a pause event. Accordingly, systems and methods are disclosed herein to improve upon and further overcome the shortcomings of returning to media content following a pause event.

The present application seeks to address the problems mentioned above by automatically generating content summaries that are tailored to one or more parameters of a pause event, thereby addressing a user's needs specific to the context of different types of pause event, e.g., a long pause event versus a short pause event. By providing these summaries in various formats and adapting their level of detail based on factors like the time since the last viewing or the inferred familiarity of the user with the show, the system aims to help users quickly recall essential information, engage with the content seamlessly, and minimize frustration associated with fragmented viewing experiences. Such an approach can lead to a reduction in operational load of a user device and/or server during a viewing session, e.g., by negating a need for a user to perform additional operations in order to refamiliarize themselves with plot details or context of media content following a pause event.

Accordingly, in a first aspect of the disclosure, there is provided a method of resuming a media content item, the method comprising: determining, using control circuitry, user watch history of the media content item by a user, wherein the user watch history comprises a pause point and a pause duration, e.g., of a pause event during a viewing session of the media content item; determining, using control circuitry, a media content summary, e.g., of the media content item, based on the user watch history; and generating, using control circuitry, the media content summary for consumption by the user, e.g., in response to receiving an instruction to start a pause event, stop the media content item, or an indication that a user is distracted from viewing the media content item. It should be understood that "pause" herein refers not only to pausing content, but also to stopping content and/or any interruption to consumption of content. A media content item may be, for example, movies, video clips, podcasts, social media video content, episodic content, serial content, TV series, a video game, eCommerce items, and the like.

In some examples, the method further comprises, in response to the user consuming the media content summary, resuming the media content item at or after the pause point.

In some examples, the method further comprises, during the user consuming the media content summary, receiving a user selection to resume the media content item at a current position in the media content summary; and resuming the media content item at the current position in the media content summary.

In some examples, wherein the media content summary comprises a portion of the media content item after the pause point; and resuming the media content item after the pause point.

In some examples, the method further comprises determining a detail level of the media content summary based on the user watch history; and wherein a length of the media content summary is based on the detail level.

In some examples, the method further comprises determining other user watch history of the media content by a plurality of other users, wherein the other user watch history comprises portions of the media content item that was skipped; and wherein the media content summary is further based on the other user watch history.

In some examples, the method further comprises determining user preferences for the determination and generation of the media content summary; and wherein the media content summary is further based on the user preferences. In some examples, generating the media content summary comprises at least one type of media from: video, images, audio, GIFs, cartoons, or text; and wherein the user preferences comprise an indication of priority for the media content summary type.

In some examples, the method further comprises sending a notification to a user device, the notification comprising the pause duration and a selectable option to view the generated media content summary.

In some examples, the method further comprises prefetching a further media content item in parallel to the generation of the media content summary.

In a second aspect of the disclosure, there is provided a system comprising control circuitry, the control circuitry configured to: determine user watch history of the media content item by a user, wherein the user watch history comprises a pause point and a pause duration; determine a media content summary based on the user watch history; and generate the media content summary for consumption by the user.

In a third aspect of the disclosure, there is provided a system for resuming a media content item, the system comprising: means for determining user watch history of the media content item by a user, wherein the user watch history comprises a pause point and a pause duration; means for determining a media content summary based on the user watch history; means for generating the media content summary for consumption by the user.

In a fourth aspect of the disclosure, there is provided a non-transitory computer-readable medium having instructions encoded thereon which, when executed, cause control circuitry to carry out a method, the method comprising: determining user watch history of the media content item by a user, wherein the user watch history comprises a pause point and a pause duration; determining a media content summary based on the user watch history; and generating the media content summary for consumption by the user.

It should be noted that examples of the first aspect are compatible with any of the examples of the second to fourth aspects.

Accordingly, there are presented herein methods, systems, and apparatus for resuming VOD content. It should be understood that the methods, systems, and apparatus may apply to any OTT content, such as movies, programs, advertisements and the like. In general, the methods, systems, and apparatus apply to OTT platforms, but should not be thought to be limited to OTT platforms, per se. For example, the present disclosure would equally apply to set-top boxes, mobile devices, and applications thereon, such as resuming video games in gaming applications.

BRIEF DESCRIPTION OF THE DRAWINGS

Embodiments of the invention are further described hereinafter with reference to the accompanying drawings, in which:

FIG. 4A illustrates a timeline of pause points in a media content, in accordance with examples of the disclosure;

FIG. 6 illustrates an exemplary flowchart of the processing involved in resuming a media content item, in accordance with examples of the disclosure;

FIG. 7 illustrates an exemplary flowchart of the processing involved in determining contextual factors for the generation of a media content summary, in accordance with examples of the disclosure.

DETAILED DESCRIPTION

Figure 1:
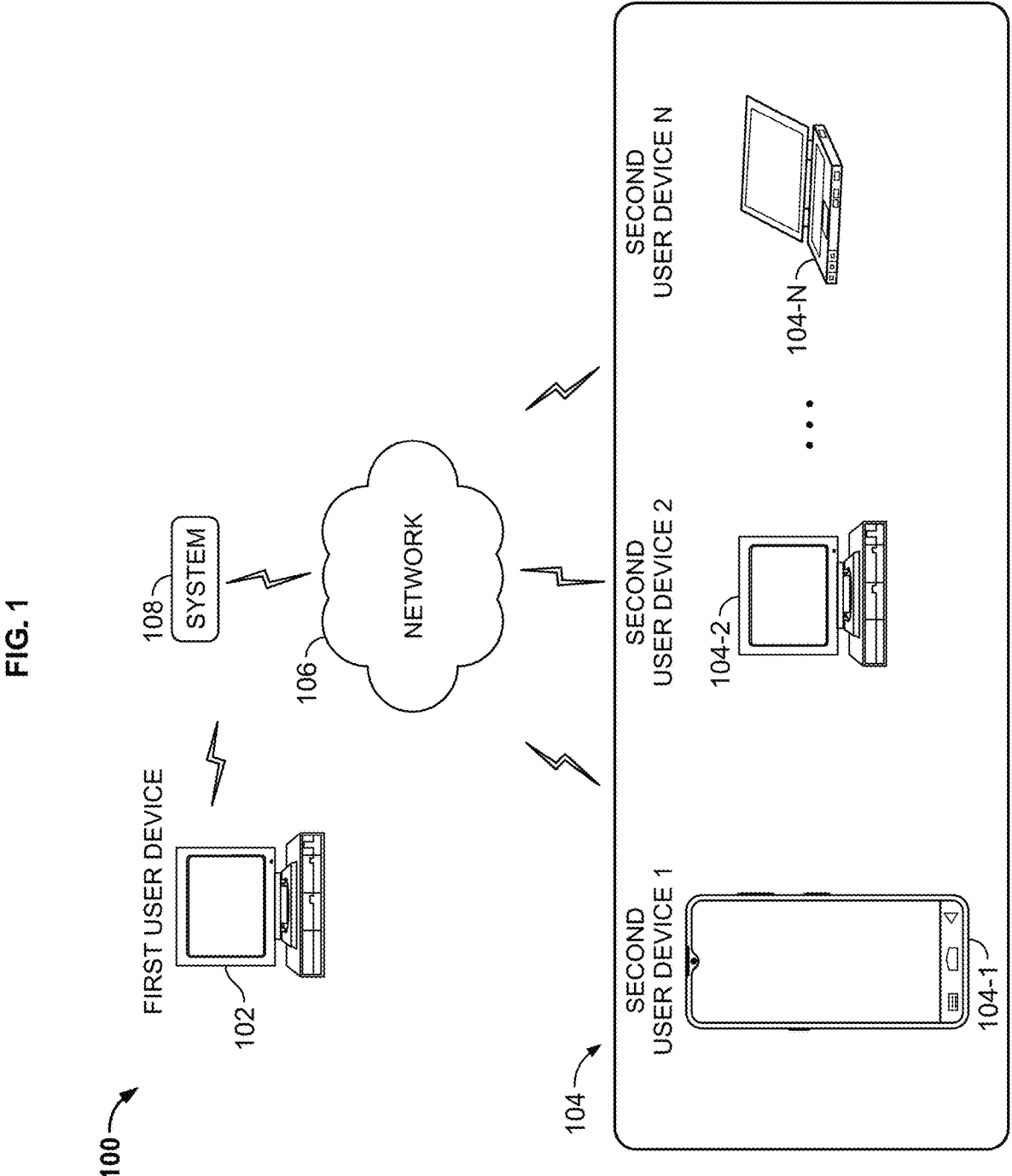
FIG. 1 illustrates an example network environment in which examples of the present disclosure may be implemented.

OTT is short for "over-the-top," which refers to a method of media distribution that serves as an alternative to traditional satellite or cable television. We are entering a future in which most media are delivered and consumed via the internet. OTT technology is distributing more and more media each day. An OTT streaming service is the application ("app") or website that users turn to access their favorite programs and movies. These services are accessible on all sorts of internet-enabled devices, including smart TVs, gaming consoles, computers, laptops, smartphones, and tablets. Typically, OTT streaming services limit access to paying users, but this is not always the case. If desired, users can pay for access on a pay-per-view basis, or they can subscribe for unlimited on-demand access to the platform. Sometimes, broadcasters monetize their content with advertisements. While references are made to OTT services throughout, the methods and systems described herein are considered to also apply to traditional set-top-boxes and to other services such eBooks, podcasts, and the like.

There are many OTT streaming services on the market. Some of these are niche services, and others have broader offerings and are geared towards a more general audience. Some focus on OTT live streaming and others only offer on-demand content. Most offer free content, premium content, or a mix of both. What all OTT streaming services have in common is that they all use the internet to deliver video content.

The problem of users having difficulty remembering plot details or context when they pause and resume watching content has been known for some time. Beyond this, an increased computational network load on a sever and/or user device as a result of user activity to recap plot details presents significant challenges, e.g., where bandwidth is limited at a user device. Media content platforms (also referred to herein as VOD platforms, VOD services, and OTT streaming services) have been aware of the importance of enhancing the user experience in this regard, and several attempts at solutions have been made to address this challenge:

Progress Bars and Timestamps: Many VOD services display progress bars and timestamps to indicate the user's viewing progress in a video. While this gives users an idea of where they left off, it doesn't provide contextual information or help them quickly recall the content they watched before;

Episode Descriptions: Some platforms offer brief episode descriptions that give users a general idea of the episode's content. However, these descriptions are only provided for each episode in a series and have nothing to do with where the user pauses the video;

"Previously On . . . " Segments: In some TV shows, there are "previously on . . . " segments before each new episode that recap key events from previous episodes. While helpful, this solution relies on the user watching each episode somewhat sequentially, but it does not help a user interrupting and resuming playback in the middle of an episode for example. Similarly, longer "previously on . . . " segments are also often proposed at the beginning of a new season of a show, but they are not tailored to a particular user. Users who return to the show years after the season is first aired are treated the same as users who start watching it as soon as it is available. In movie universes (such as the Marvell Cinematic Universe®), references to key plot elements in previous instalments of a franchise are often woven inside the story of a new instalment and assume these references will be sufficient for users to recall these plot elements. However, depending on how invested a user is in a franchise, that may not always be the case.

The prior approaches mentioned above have their limitations. They either lack context, rely on sequential viewing, or provide only generic information. Furthermore, none of the prior are aimed at reducing operational load of network caused by recapping actions of a user. The present disclosure aims to improve upon these prior approaches by automatically generating personalized and dynamic content summaries that adapt to the user's viewing habits and preferences. This approach offers a more comprehensive and tailored resumption experience, increasing user engagement and satisfaction with VOD content. Accordingly, a technical effect and advantage of the present disclosure offers a reduction in operational load of network caused by recapping actions, e.g., by providing tailored ways to help a user recall previous storylines.

The present disclosure describes an innovative and dynamic VOD resumption system that automatically generates personalized content summaries for users who pause and resume watching. The disclosure leverages, for example, AI-driven algorithms to analyze users' watching habits and the time elapsed since the last viewing to tailor the generated summaries. When a user returns to continue watching a video, the system presents them with relevant content summaries in various formats, including, for example; video, images, GIFs, cartoons, audio, text summarizations, and the like. These summaries serve as "memory jolts," providing quick recaps of past content, key events, or character arcs. In addition, the systems and methods offer users suggestions to start a series at a specific point based on user feedback while providing summaries for the video before that point. In some examples, a summary for the remaining video content for users who wish to conclude their viewing experience after returning from pause is provided.

The key benefits and advantages enabled by the proposed solution surpass existing technologies in the field of VOD services. While some platforms may provide basic episode descriptions or progress bars, they lack context and personalization. The present disclosure goes beyond static episode descriptions by offering dynamic and adaptive content summaries, taking into account individual viewing habits and preferences. By using the proposed methods, the system can continuously improve its summarization capabilities, making it more accurate and personalized over time, which further reduces a user's need to perform separate recapping actions. This level of personalized and dynamic resumption experience is not currently available.

In some examples, a media platform allowing users to pause and resume a program at a later time may offer additional content to help users remember the storyline of said program. For example, the media platform may offer a summary of the different storylines just prior to the moment the user is resuming. In the case of an episodic program, a media platform may offer a summary of the episode so far. The media platform may personalize the summary it offers based on the target user consumption of the program to summarize. It may take into account the time between the cessation of watching and the resumption of watching to adapt the content of the summary. Illustratively, the system may summarize the scenes and storyline that happened just prior to the cessation of watching if the time between said cessation and resumption is short (e.g., less than a day) and it may provide more background information on the overall plot of the content—as will be described in more detail below.

FIG. 1 illustrates an example network environment 100 in which examples of the present disclosure may be implemented.

Referring to FIG. 1, the network environment 100 includes a first user device 102, and one or more second user devices (104-1, 104-2 . . . 104-N) operated by a user (not shown). The network environment 100 includes a system 108 communicatively coupled to the first user device 102 and the one or more second user devices (104-1, 104-2 . . . 104-N) via a network 106. It may be appreciated that the one or more second user devices (104-1, 104-2 . . . 104-N) may be collectively referred as the second user devices 104 and individually referred as the second user device 104. It may be appreciated that the first user device 102 and the second user device 104 may be collectively referred as user device or user devices (102, 104). Further, it may be appreciated that there may be any number of users operating any number of user devices (102, 104) within the network environment 100. In some examples, multiple users may operate a same user device (102, 104).

In some examples, the first user device 102 may render a graphical user interface on the first user device 102 such that a user of the first user device 102 may communicate with the system 108 via the graphical user interface rendered on the first user device 102. The graphical user interface may be rendered on the first user device 102 under control of the system 108.

In some examples, the user device (102, 104) may include, but is not limited to, a handheld wireless communication device (e.g., a mobile phone, a smart phone, and so on), a wearable computer device (e.g., a head-mounted display computer device, a head-mounted camera device, a wristwatch computer device, and so on), a vehicle infotainment System, a laptop computer, a tablet computer, a television (TV), or another type of portable computer, and/or any other type of user device (102, 104) with wired or wireless communication capabilities, and the like. In some examples, the user device (102, 104) may include, but is not limited to, any electrical, electronic, electromechanical, or equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device (102, 104) may include one or more in-built or externally coupled accessories including, but not limited to, a visual aid device such as camera, audio aid, a microphone, a keyboard, and input devices for receiving input from the user such as touchpad, touch-enabled screen, electronic pen, and the like. Further, the user device (102, 104) may include, but not be limited by, intelligent, multi-sensing, network-connected devices, that can integrate seamlessly with each other and/or with a central server or a cloud-computing system or any other device that is network-connected.

In some examples, the system 108 may be implemented as a cloud server which may execute operations through web applications, cloud applications, hypertext transfer protocol (HTTP) requests, repository operations, file transfer, and the like. In some examples, system 108 may be implemented as a plurality of distributed cloud-based resources by use of several technologies that are well known to those skilled in the art.

In some examples, the functionalities of system 108 may be incorporated in its entirety or at least partially in a server (not shown), without departure from the scope of the disclosure. The server may be implemented as a cloud server which may execute operations through web applications, cloud applications, HTTP requests, repository operations, file transfer, and the like. Other examples of the servers may include, but are not limited to, a database server, a file server, a web server, a media server, an application server, a mainframe server, a cloud server, or other types of servers. In one or more examples, the server may be implemented as a plurality of distributed cloud-based resources by use of several technologies that are well known to those skilled in the art.

Referring to FIG. 1, the first user device 102 may store and execute a client-side application that presents, to the user, one or more user interfaces. The client-side application may interact with a server-side application or the system 108.

In some examples, the system 108 may be remote from the user devices (102, 104) and communicatively coupled to the user devices (102, 104) in a secure manner via the network 106. In some examples, network 106 may include, but is not limited to, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. Network 106 may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof. In some examples, network 106 may include, but is not limited to, the Internet, a cloud network, a Wireless Fidelity (Wi-Fi) network, a Personal Area Network (PAN), a Local Area Network (LAN), or a Metropolitan Area Network (MAN). Various components in the network environment 100 may be configured to connect to the network 106, in accordance with various wired and wireless communication protocols.

Although FIG. 1 shows exemplary components of the network environment 100, in other examples, the network environment 100 may include fewer components, different components, differently arranged components, or additional functional components than depicted in FIG. 1. Additionally, or alternatively, one or more components of the network environment 100 may perform functions described as being performed by one or more other components of the network environment 100.

Figure 2:
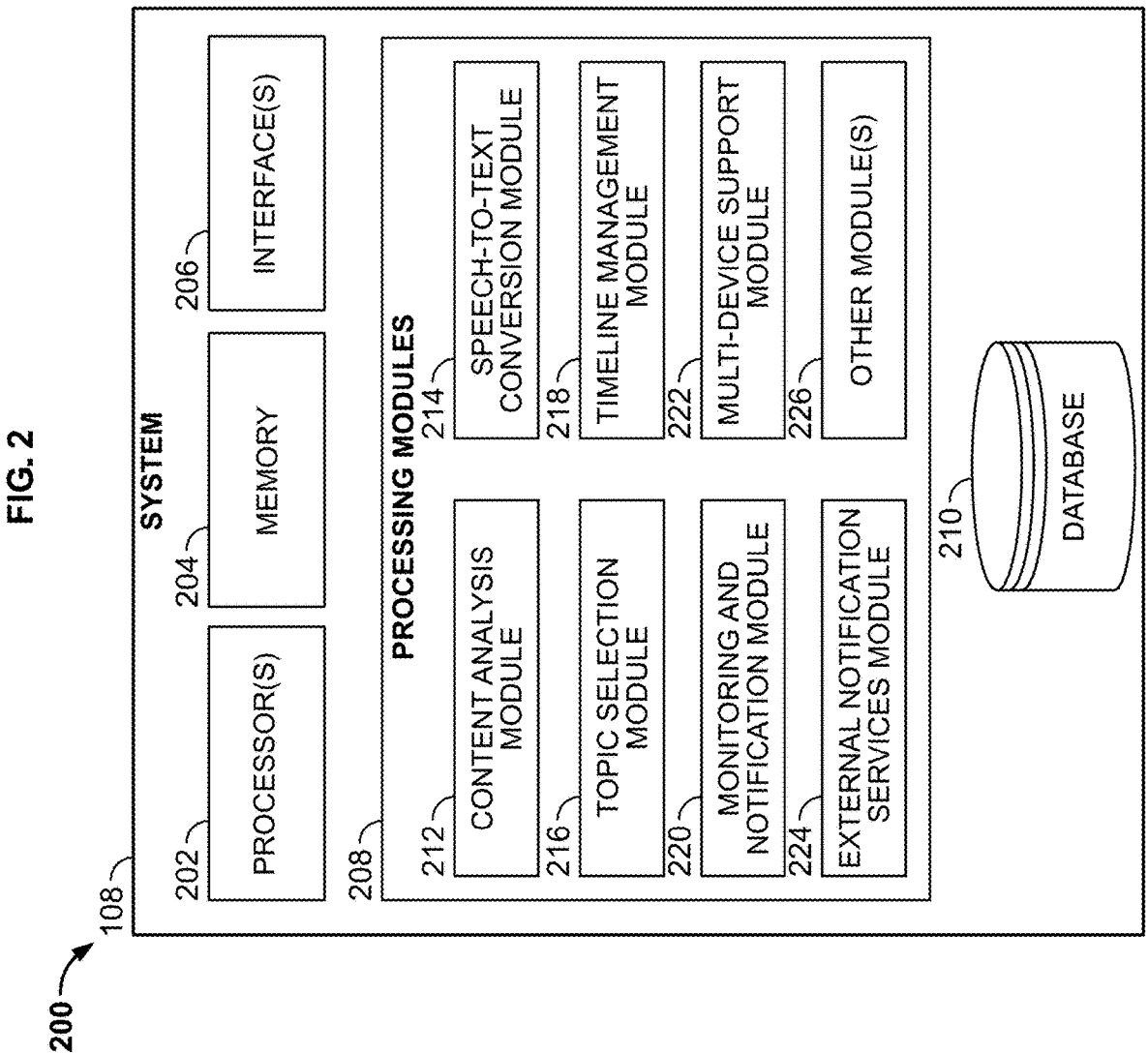
FIG. 2 illustrates an example block diagram of a proposed system, in accordance with examples of the present disclosure.

FIG. 2 illustrates an example block diagram 200 of a proposed system (e.g., 108), in accordance with examples of the present disclosure.

Referring to FIG. 2, system 108 may include, but is not limited to, one or more processor(s) 202, a memory 204, an interface 206, one or more processing module(s) 208, and a database 210. In some examples, the processor 202 may communicate with the memory 204. The memory 204 may consist of multiple memory units and store non-transitory instructions that the processor 202 may execute in accordance with examples of the present disclosure. In some examples, interface 206 may facilitate communication between processor 202 and external entities including, but not limited to, user devices (e.g., 102 and 104). In some examples, interface 206 may employ various communication media, such as radio, optical fibre, telephone, wire, etc. Interface 206 may also include one or more communication networks, including the Internet. Further, database 210 may be communicatively coupled with the processor 202 and the memory 204. Database 210 may store data in a structured format and provide fast access to the stored data. The processor 202 may access the database 210 to retrieve or store data as required by the present disclosure.

In some examples, the processor 202 may include suitable logic, circuitry, and interfaces that may be configured to execute program instructions associated with different operations to be executed by the system 108. In some examples, processor 202 may be implemented as one or more microprocessors, microcomputers, microcontrollers, edge or fog microcontrollers, digital signal processors, central processing units, logic circuitries, and/or any devices that process data based on operational instructions. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

Among other capabilities, the processor 202 may be configured to fetch and execute computer-readable instructions stored in the memory 204 of the system 108. Memory 204 may be configured to store one or more computer-readable instructions or routines in a non-transitory computer-readable storage medium, which may be fetched and executed to create or share data packets over a network service. Memory 204 may comprise any non-transitory storage device including, for example, volatile memory such as Random-Access Memory (RAM), or non-volatile memory such as Electrically Erasable Programmable Read-only Memory (EPROM), flash memory, and the like.

In some examples, the interface(s) 206 may comprise a variety of interfaces, for example, interfaces for data input and output devices, referred to as input/output (I/O) devices, storage devices, and the like. The interface(s) 206 may facilitate communication for the system 108. The interface(s) 206 may also provide a communication pathway for one or more components of the system 108. Examples of such components include but are not limited to, the processing module(s) 208 and the database 210. In some examples, the database 210 may comprise data that may be either stored or generated as a result of functionalities implemented by any of the components of the system 108 such as, but not limited to, user preferences, user profile, identifiers of user devices (102, 104) associated with the user, interruption times, interruption preferences, user-preferred media topic(s), notification settings, privacy controls, viewing history, synchronization preferences, and the like.

Although the database 210 is shown as being a part of system 108, it is to be understood that in other examples, the database 210 may be separate from the system 108 and may be hosted on another server that is communicatively coupled to the system 108. In some examples, the database 210 may be cloud-hosted.

In some examples, the processing module(s) 208 may be implemented as a combination of hardware and programming (for example, programmable instructions) to implement one or more functionalities of the processing module(s) 208. In examples described herein, such combinations of hardware and programming may be implemented in several different ways. For example, the programming for the processing module(s) 208 may be processor-executable instructions stored on a non-transitory machine-readable storage medium and the hardware for the processing module(s) 208 may comprise a processing resource (for example, one or more processors), to execute such instructions. In the present examples, the machine-readable storage medium may store instructions that, when executed by the processing resource, implement the processing module(s) 208. In such examples, system 108 may comprise the machine-readable storage medium storing the instructions and the processing resource to execute the instructions, or the machine-readable storage medium may be separate but accessible to system 108 and the processing resource. In other examples, the processing module(s) 208 may be implemented by an electronic circuitry.

Referring to FIG. 2, the processing module(s) 208 may include a content analysis module 212, a speech-to-text conversion module 214, a topic selection module 216, a timeline management module 218, a monitoring and notification module 220, a multi-device support module 222, an external notification services module 224, and other module(s) 226. In some example examples, the other module(s) 226 may include, but is not limited to, a data ingestion module, or the like, within the scope of the present disclosure.

Figure 3A:
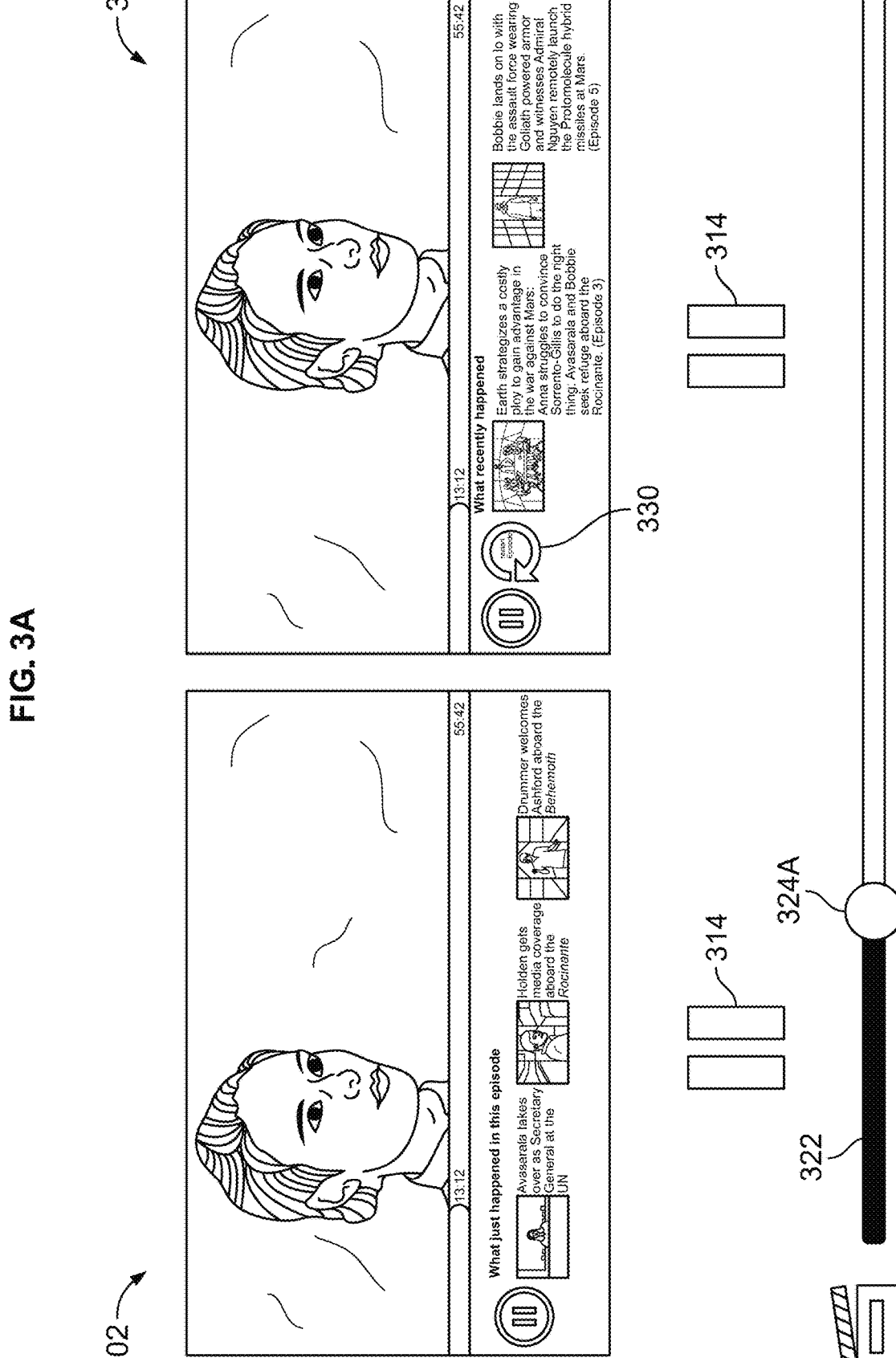
FIGS. 3A-3B illustrate implementations of the present disclosure, in particular added media content summaries to a VOD service, in accordance with examples of the disclosure.
Figure 3B:
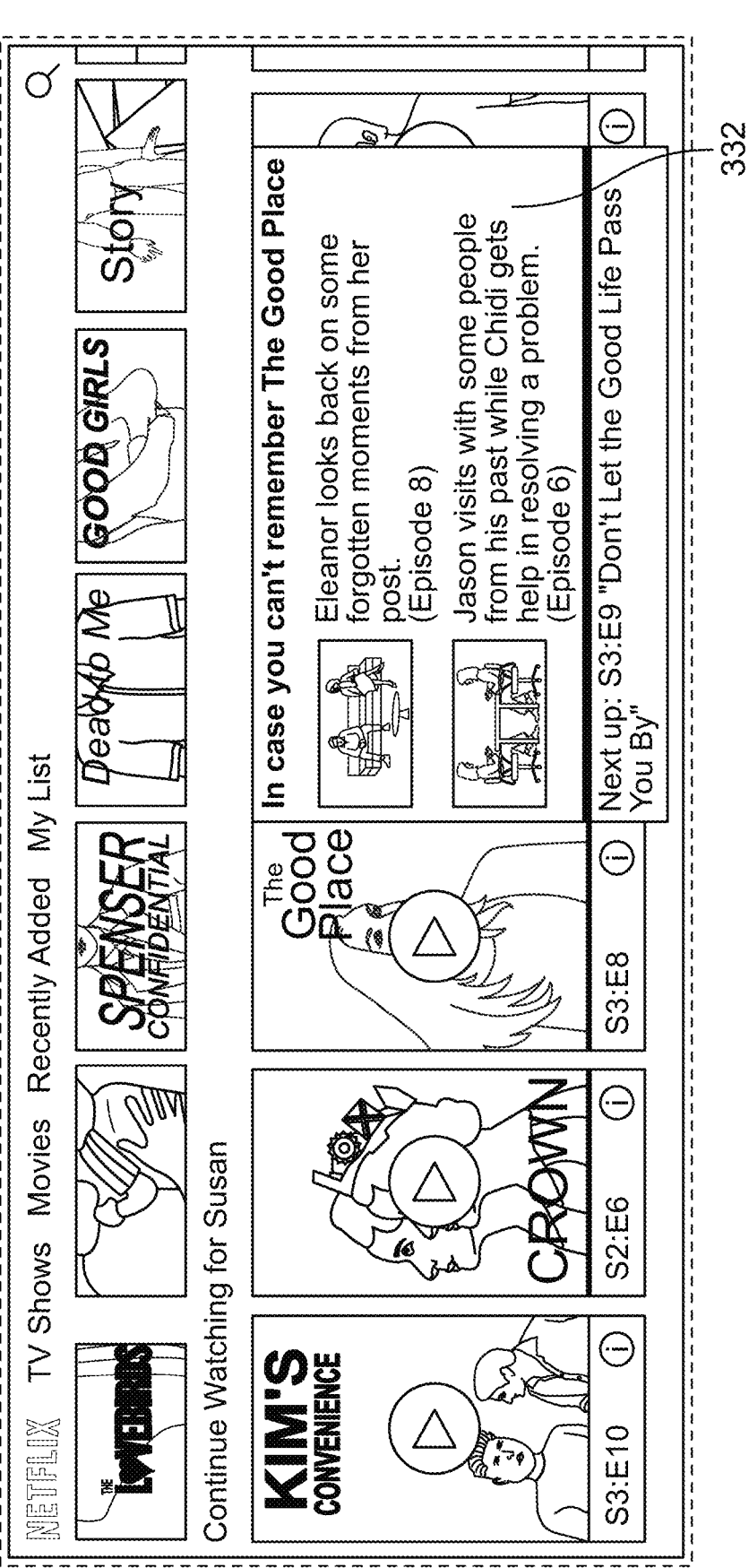

FIGS. 3A-3B illustrate implementations of the present disclosure, in particular, added media content summaries to a media content item, in accordance with examples of the disclosure. FIG. 3A shows two examples of resuming a program after a period of time. In particular, the left-hand image of media content 302 shows the resumption of the media content after a relatively short period of pause (e.g., less than a day or a few days). The right-hand image of media content 304 shows the resumption of the media content after a relatively longer period of pause (e.g., more than a week). Pause indicator 314 is an illustration to show that media content 302 and 304 are paused when the user returns to the media content service. Progress bar 322 shows that media content 302 and 304 have been paused at a particular point, the skilled person in the art will understand that this is also for illustrative purposes and relates to position 13 minutes 12 seconds in the media content 302 and 304.

As shown in FIG. 3A, the summarization of media content 302 is relevant to what happened so far in that episode, as the pause period is for a relatively short period of time (e.g., a few days). Accordingly, the media content summary describes the plot of the main scenes of the main characters in that particular episode, which would be sufficient to remind the user.

A media content summary may be generated for movies, video clips, podcasts, social media video content, episodic content, serial content, tv shows, video games, eCommerce items, and the like. For example, for a video game, the system may be applied to play a portion of the last level since you last played (if, for example, there are several cut-scenes in the game and it has been a while since the user played the game last time).

In some examples, the type of content summary depends on the type of content; for example, an audio summary would be generated for an e-book or a podcast, and the summary might include references to the pages or chapters so the user can jump to those sections at any point. In some examples, the device type can determine whether you can only present audio or whether you can also present video based on its capabilities—which may also be a resolution type for devices that can only display, for example, 1080p content.

Also shown in FIG. 3A is the summarization of media content 304 relevant to what recently happened in the series up to that point, as the pause period is for a relatively longer period of time (e.g., more than a week). In particular, the media content summary on media content 304 displays information not necessarily relevant to the scene where viewing is resumed, but to the overall understanding of the context of the episode. System 108 may identify key elements that happened during episodes of the same season as relevant for the overall context of the season and generate a summary for it. If the resumption of the program consumption happens after a relatively long period of time (e.g., weeks or months), the platform may also include elements from previous seasons to provide more context for the user to recollect what they were watching. The media platform may also factor in the complexity of the plot or the number of relevant subplots to build a summary. It may also include summaries for each of the main characters of the program.

In some examples, the genre of the media content 304 determines whether the content is eligible for summarization. For example, when the user resumes a late-night show, the system might not need to summarize previous episodes of the show. In this way, events that occurred in the show, such as, a monologue, an interview with an actor, etc. may be summarized but not other previously aired content from (for longer running shows) years previous. By way of another example, in some TV shows, such as sitcoms, not every episode is related to the other, therefore it can be more appropriate for the summarization to be limited to character arcs within the larger story across seasons.

In some examples, if the user pauses a recently resumed media further, the pause/resume screen may be updated to include a storyline related to the characters or the scene that was on the screen when the pause happened. The media player may also offer different options for resuming content based on the time between pause and resume. For example, if that time is long, the media player may offer to restart the episode in addition to just resume playback where the media content item was left off, by way of a selectable icon 330.

As shown in FIG. 3A, a textual summary as well as an associated thumbnail is used to illustrate the concept. In some examples, the thumbnail may be animated such as a video and/or an animated GIF. In some examples, the thumbnail may be generated using video summarization methods known in the art, and described below. In some examples, the content summary may be generated by a generative text-to-video AI based on the textual summary as prompt and a generative model trained on the show style and characters. In some examples, an image is generated using a short summarization of the content and a generative text-to-image model trained on the genre of show and characters therein. In some examples, the content summary is selectable, or elements thereof such as the thumbnails.

In some examples, advertisements may be included amongst the content summary thumbnails. For example, the summary may be a playlist that the user is playing the content summary through, as the summary content is played in order, advertisements may be inserted to play as a part of the playlist. This could be particularly relevant when the summary covers large portions of the media content item and would miss or skip advertisements that would have been otherwise consumed by the user. Therefore, the advertisement slots the user might miss can be otherwise inserted and consumed by the user. In some examples, if the thumbnail for the content summary is a static image, with some sort of textual description, then it may be displayed for a period of time.

Moreover, in some examples, the users can browse the content summary or content summaries as they would for episodes on an OTT service, or the like. In such an example, there is an ad placement opportunity on the player if content summarization is generated or displayed. In this way, the system may interact with an advertisement server to get an advertisement to display when it is determined that the user has selected a media content summary. In some examples, the media content summary—which may be considered a condensed viewing format of the show and/or a character arc—can be accessible after the consumption of an advertisement.

Referring to FIG. 3B, shown is an illustrative image of the content library 306 of a media content service. In particular, FIG. 3B demonstrates that the media platform may offer summarization on the user's home page as part of a "continue watching feature," or if the user intends to rewatch a previously viewed media content. In particular, in this example, the media content summary is of whole episodes within a season of episodic media content, as the pause period (time since completing the series, in this case) is for a relatively longer period of time (e.g., more than a week). In some examples, the "continue watching" section of OTT platforms, or the like, may comprise a selectable thumbnail of the content summary, or the content summary "thus far", referring to the fact that the media content summary for a particular user can change as time goes on, as described in other examples herein. In this way, when the user selects a content summary for a particular show, the system can play the summary and resume the content from the last pause point.

Put another way, the media content summary file and the actual episode file may be thought of as different items offered to the user for consumption: the media content summary file can be linked to the last watched episode or pause point. Accordingly, in response to the system detecting that the user selects the media content summary or begins consuming the media content summary, the system may then start fetching the content associated with the referenced last watched episode/last known pause point, e.g., in parallel. With regard to the system, in some examples, it may generate a manifest file that references the summary content and the last watched episode.

In some examples, the summaries (text, images, videos, animations) may be interactive, such as the selectable options 332 of watching episodes of media content shown in the media content library 306, allowing a user to jump to the particular episode (or in some examples, a particular scene) depicted in the summary. In this way, the user is provided with a memory aid specific to their progress or viewing history of a media content item.

It should be understood that the playback of an episode, scene or the like, may happen in full screen or may be limited to a portion of the screen (picture-in-picture). It may be accompanied by sound or by captions or both. Once the user initiates playback, the program may resume where it was previously left off, and a subsequent pause screen would be updated with a new collection of media content summaries based on the newly updated watch history of the user.

In some examples, system 108 may send out reminders to a user device 104-N that they paused a particular program and may append to these reminders one or more personalized summaries to help the user keep the program fresh in their memory, and potentially entice the user to return to the media content. As time passes and the program has still not been resumed, system 108 may send more reminders and update the content of the media content summaries in a similar fashion as described above, in particular, as the pause time is increasing.

In some examples, system 108 may detect the lack of interest of a first group of users for certain parts of a media item including certain episodes in the case of an episodic media item such as a TV series. When a user whose profile is similar to those of the first group accesses said media content item, system 108 may generate a media content summary to summarize the uninteresting parts of the content before playing the media item from the point when it becomes interesting. Illustratively, a group of users may rate an episode out of a scale of 5, for example, episodes 1, 2, and 3 of a series as 1 out of 5 (1/5) and episodes 4 to 10 as 4/5 or the like. In such an illustrative example, system 108 may generate a media content summary of episodes 1 to 3 for a user who has a similar user profile to the group of users and prompt the user to play that summary before proceeding with episode 4.

In some examples, a user may decide to stop watching a very long piece of content or a series with a lot of episodes left. They may however wish to get closure and know how the series or a story arc ends. Accordingly, e.g., upon user request, system 108 may generate media content summaries for the remainder of the piece of content so that the user can, instead, listen to or watch the summary. The duration and content of the summary may be tailored to the user based on their viewing, watching, or listening habit on the media content service and on that particular piece of content. Illustratively, system 108 may have detected that the user had skipped certain scenes or certain episodes and use such contextual information to update the media content summary.

In some examples, system 108 may offer various levels of detail for the media content summary (e.g., and various durations as a result of the levels of detail). For example, system 108 may prompt the user to "finish this in 3 minutes" or "summarize it in 10 minutes". System 108 may then generate a media content summary according to the user instruction which, in this illustrative example, would be a condensed version of the piece of content containing various key scenes unfolding its storylines. In some examples, System 108 may generate a voice-over commentary to replace the actual audio track of the content item. The content of the summary may be tailored to a certain character (e.g., "What happened to John Snow?", "What happened to Khaleesi?"). Multiple summaries may be offered to the user for selection. The summaries may be presented as supplemental content when a user accesses a particular media item or may be added to the user's home screen when the media platform detects they have been neglecting content they have started watching.

Figure 4B:
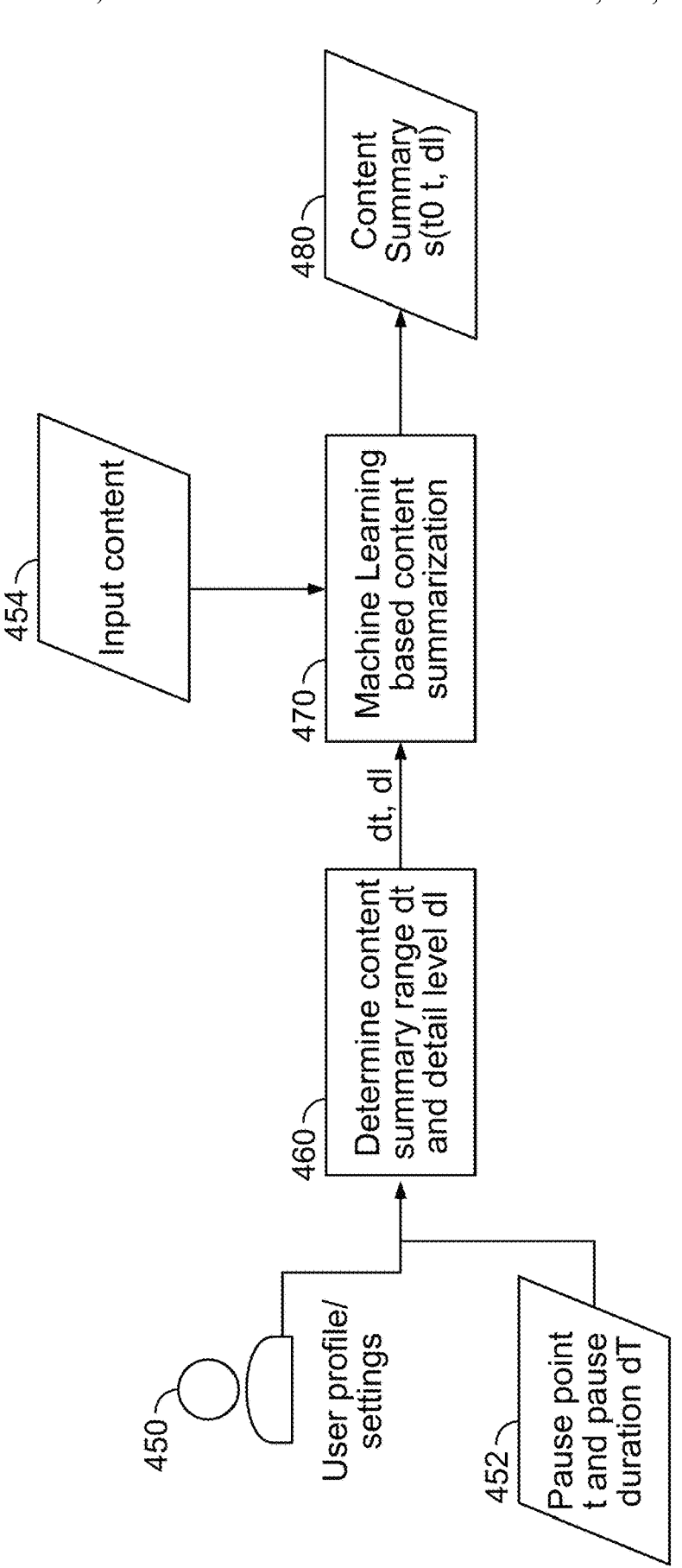
FIG. 4B illustrates a flowchart of generating personalized and dynamic video summaries, in accordance with examples of the disclosure.

FIGS. 4A-4B illustrate a timeline 400 of pause points in a media content and a flowchart of generating personalized and dynamic video summaries, in accordance with examples of the disclosure. With reference to FIG. 4A, there is shown a real world timeline 412, which illustrates the passing of time, and a video timeline 414, which illustrates the timeline of the media content item. Video timeline 414 may be considered a progress bar 322, such as that shown in FIG. 3A.

The notations and parameters shown in FIG. 4A are defined as follows:

Pause Time (T0): This is the real-world time when the user pauses the content. It's used in conjunction with T1 to calculate dT;

Current Time (T1): This is the real-world time when the user resumes watching the content. Alongside T0, it's used to calculate dT;

Elapsed Time (dT): This is the real-world time elapsed from T0 to T1. This parameter helps infer the range of the content to be summarized (dt), and the detail level (dl), which is based on the user's profile and settings, in some examples;

Detail Level (dl): The level of detail to be included in the summary, determined by the user's profile/settings and the elapsed time dT, in some examples dl can be non-constant, in that dl may change to a higher value towards T0 and lower toward T1, or vice versa, or indeed may be a user selectable setting;

Video Summary Range (dt): The amount of content to be summarized, inferred from dT and, in some examples, the user's profile/settings, memory retention level, or requested detail level;

Pause Point in Video (t): The timestamp in the video where the user initially paused. This, in combination with dt, gives us t0, the starting point for the media content summary; and Start Point for Summary (t0): Calculated as t–dt, this gives the starting point in the content from where the system will generate the summary.

In an illustrative example, the pause duration dT=T1−T0, and the pause time in a video (t) is known by system 108, which accordingly calculates the video summary range, dt. In some examples, an Ebbinghaus human forgetting curve can be utilized to help calculate the video summary range, dt. Known in the art of Psychology from Hermann Ebbinghaus' 1885 hypothesis in *Memory: A Contribution to Experimental Psychology*, the "Ebbinghaus forgetting curve," is a psychological concept that describes how information is forgotten over time if it is not actively reviewed or reinforced. The curve suggests that there is a rapid decline in memory retention shortly after learning new information, followed by a more gradual decline over time. A simple form of this curve can be mathematically described as an exponential decay function:

$$R = e^{-\frac{dT}{k}}$$

Where R represents the retention strength (memory retention) at time dT, k is a constant related to the stability of memory, determining how fast R falls over time, and e is the base of the natural logarithm (approximately 2.71828). In the present disclosure, the constant k is set differently for different users' based on their memory stability, and can be adjusted by the user. Accordingly, in some examples, the user can set their memory stability from 1 to 5, where 5 means having a very good memory, and we can use the following table to determine k.

| Stability Level | 1 | 2 | 3 | 4 | 5 |
|---|---|---|---|---|---|
| K (hour) | 8 | 16 | 32 | 64 | 128 |

Given k and dT, we can calculate the retention strength of the memory, and video summary range dt can be calculated as dt=f(R), where the function f can be polynomial, such as:

$$dt = t * (1 - R)^p$$

Where p is a positive constant. By default, p is set to p=1, so the function is a linear function. In some examples, this can be updated to better reflect the user's memory, based on for example user watch history, to be an exponential function or a logarithm function.

Given dt, we can calculate t0=t–dt, together with the detail level dl, which can be set in user's profile settings, the system applies machine learning algorithms to create a personalized summary, s (t0, t, dl). It analyzes the video content from t0 to t, extracting key events, plot points, and character developments, and presents them in a format according to the chosen detail level dl. The extraction can be carried out by one or more of the processing modules 208 described with reference to FIG. 2. This process allows the system to offer a finely tuned resumption experience that dynamically adapts to the user's individual needs, habits, and preferences, enhancing their engagement and viewing enjoyment.

In some examples, as shown in FIG. 4A, system 108 identifies a future point t1 based on the user profile and, in some additional examples, other user reviews, as described above, and selects a resumption point for the user. System 108 therefore provides a media content summary covering the video segment [t, t1].

In some examples, system 108 generates an audio and/or text summary using a large language model. This uses a detailed and time-stamped version of the entire video content, if a summary s (t0, t, dl) is needed, system 108 can use a large language model, such as ChatGPT, to generate a summary with a defined detail level dl, from the detailed text description from t0 to t1. This scheme can be applied to media content summaries as well, that is to say, system 108 can generate a media content summary of the entire media content item in the first instance, and given t0, t, and dl, can further generate different levels of media content summary (based on dl) from time t0 to t. In this way, system 108 does not need to process the entire original data to get a summary, making for a more efficient process that is less computationally demanding.

In some examples wherein system 108 is set to generate a summary of the entire media content, system 108 can generate a sequence of highlight images with corresponding descriptions. In this case, all the highlight frames from the video content are determined, which could be done with the highlight frame extraction algorithm as described below.

The media content is cut into different scenes. For each scene, if the scene is longer than a threshold, N seconds, it is cut it at every multiple of N seconds. For each cut segment, all I-frames in each segment is determined. The best I-frame is chosen, e.g., based on the image quality as a highlight frame. Depending on the range [t0, t], system 108 obtains all the highlight frames within the range, and in some examples also based on the detail level dl, and selects a subset of highlight frames from all the highlight frames within the range. In some examples, the highlight frames are selected in regular intervals. For example, if the dl is in the range of 1 . . . 5, the highlight frames will be chosen every 6-dl frames. In an example, when dl=5, highlight frames will be chosen every frame, while when dl=1, highlight frames will be chosen every 5 frames.

In some other examples, system 108 generates text summaries based on video range [t0,t] and the detail level dl, then selects corresponding highlight images for each segment of the text summary.

In some other examples, system 108 uses multiple highlight images to generate GIFs to replace static images, and may also use style transfer to generate cartoons of the highlights.

In another example, the media content summary is provided as PIP on the display, on a second screen, or on an AR, MR, or XR device that provides a summary at a place nearby the user's main screen.

In some examples, system 108 can detect key moments when users are highly engaged or let a user manually bookmark some key moments when they watch. When users resume watching, the system can provide detected or bookmarked highlights.

In some examples, system 108 may provide users with the option to customize a parameter to control the length of the media content to be summarized. For example, someone with good memory would choose a smaller value so that the system will provide a relatively shorter video summary range.

In some examples, system 108 can create visual representations of character arcs, showing how each character's journey has evolved up to the point where the user paused. This could include key events and relationships.

In some examples, when the user is watching a linear broadcast and needs to stop watching, they may record the rest of the program for the future watching, at the same time, a dense summary of what the user has watched can be generated and stored. When the user comes back to watch the recording, the summary, or a modified version of the summary, can be provided for the user to provide a smooth video resumption experience.

In some examples, when the streaming service contains advertisements, like in advertisement supported video on demand, AVOD, which is a monetization strategy used by video-on-demand platforms, system 108 can demarcate advertisements separately from the media content. For example, if the users want to rush to the end or skip a large portion of video, and the summarization part is long enough, the system 108 can show advertisements while the media content summary is displayed and consumed by the user. In addition, if there is missed advertisements that were supposed to show but were skipped due to the summarization, system 108 can re-arrange slots to show those advertisements during the future content playback. In some examples, the length of advertisements is proportional to the length of the content summary; in this way, 1 hour of missed ads won't be played for a 10 minute content summary.

Figure 5:
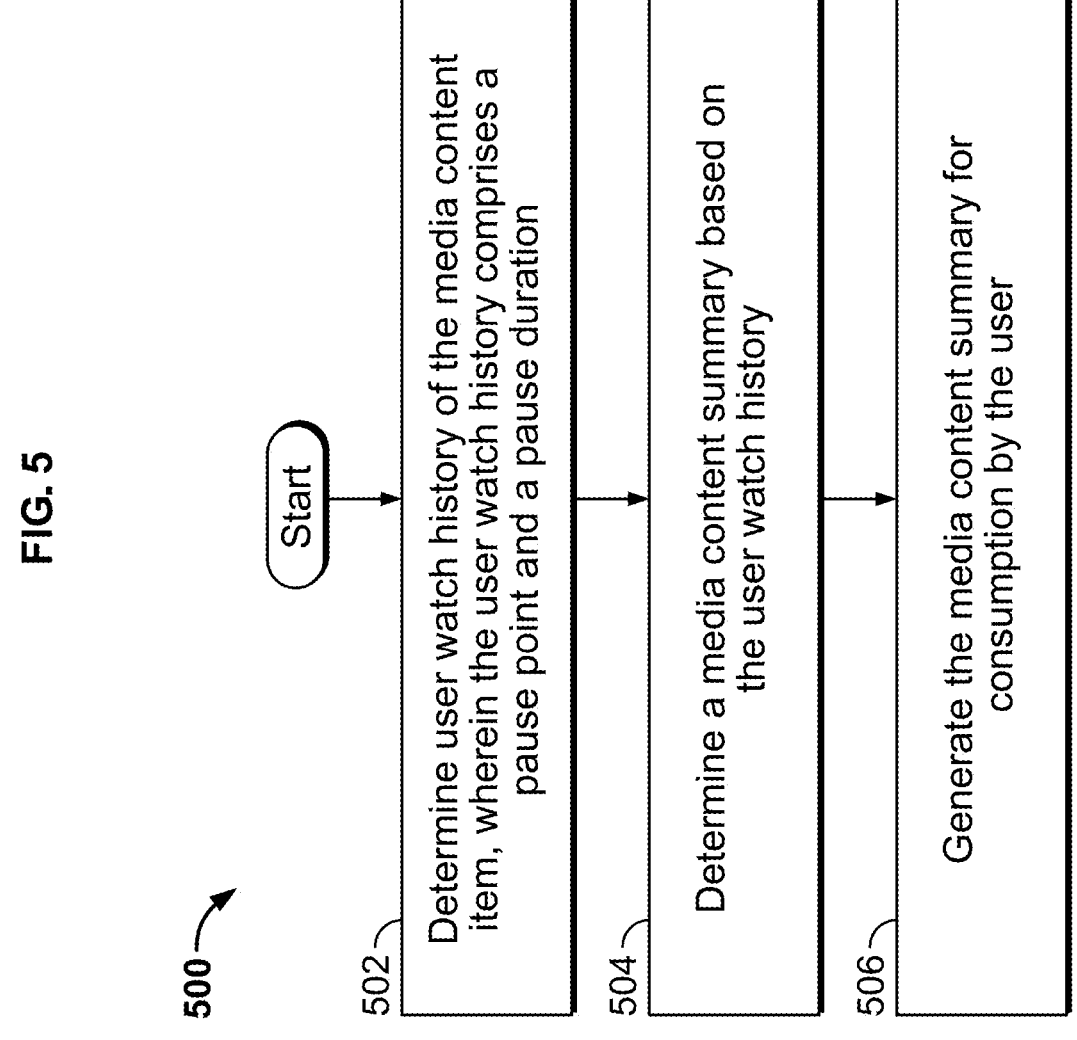
FIG. 5 illustrates an exemplary flowchart of the processing involved in resuming a media content item, in accordance with examples of the disclosure.

FIG. 5 illustrates an exemplary flowchart of the processing involved in resuming a media content item, in accordance with examples of the disclosure. This process can be carried out by control circuitry or processing circuitry on the user device 816. Process 500 starts at step 502.

At step 502, user watch history of the media content item is determined, wherein the user watch history comprises a pause point and a pause duration. The pause point, for instance, is a timestamp indicating where the user halted their viewing, e.g., at a particular frame or the start/end of a scene. This could be a cliffhanger moment in a drama series, a crucial turning point in a movie, or a suspenseful scene in a documentary. The pause duration, on the other hand, refers to the length of time the user takes a break from viewing. This could range from a few minutes during a quick bathroom break, several hours during a workday, or even several days or weeks if the user is away on vacation or simply taking a break from the media content item.

At step 504, a media content summary is determined based on the user watch history. This rich, detailed user watch history is then analyzed by the control circuitry, a sophisticated system that could be powered by an AI-driven algorithm. This algorithm is not a simple data processor; it is a complex, intelligent system capable of understanding patterns, recognizing trends, and making predictions. It sifts through the user watch history, identifying key data points, and using them to generate the media content summary. Indeed, in some examples, the algorithm uses audio and video summarization technologies, as well as other techniques such as LLMs for summarization, generative AI for creating story arc visuals etc. Furthermore, variables described earlier such as elapsed time, the amount of content to be summarized, user profile and settings such as memory retention, detail level, and the like, are provided as input to the underlying summarization technologies.

At step 506, the media content summary is generated for consumption by a user. The media content summary is a concise, yet comprehensive recap of the media content item. It is not a generic, one-size-fits-all summary; it is a personalized synopsis that is tailored to the user's viewing habits and preferences. It could highlight key events, emphasize character arcs, or even focus on specific themes or motifs that the user is particularly interested in. For instance, if the user frequently pauses during action scenes, the media content summary could provide a detailed breakdown of these scenes. If the user often takes long breaks during dialogue-heavy sequences, the media content summary could offer a concise summary of these conversations.

Moreover, the media content summary serves as a "memory jolt" for the user, a cognitive aid that helps them recall key plot details, character developments, and thematic elements. It is a tool that addresses the common problem of viewers forgetting crucial details or losing context when they pause and resume watching content. This is particularly useful in today's media landscape, where viewers often juggle multiple media content items at once, from binge-watching series to catching up on news, to exploring user-generated content.

In some examples, the content summary may be based on a character information, e.g., a character featured in the media content when the media content is paused For example, when the user resumes watching, whenever a character of interest to the user appears in the media content, on option to generate a summary relating to that character may be presented to the user. For example, each character may be designated as i, where i=1, 2, . . . n, depending on how many characters there are in the media content. As such, a character summary s_i (t0,t, dl) may be presented to the user, e.g., in response to a user request to view a summary relating to that character, or automatically, depending on a setting for automatic generation of character summaries.

FIG. 6 illustrates an exemplary flowchart of the processing involved in resuming a media content item, in accordance with examples of the disclosure. This process can be carried out by control circuitry or processing circuitry on the user device 816. One or more steps of Process 600 can be carried out in addition to, or in parallel to, steps of process 500. Process 600 starts at step 602, step 604, or step 608.

At step 602, in response to the user consuming the media content summary, the media content item is resumed at or after the pause point using control circuitry. Advantageously, this feature allows for a seamless transition from the media content summary back to the media content item. The control circuitry, using the pause point from the user watch history, can accurately resume the media content item at the exact point where the user left off, or from a future point in the media content. This eliminates the need for the user to manually find their last viewing point, or a viewing point that naturally follows on from the media content summary, further enhancing the user experience.

At step 604, a user selection to resume the media content item at a current position in the media content summary is received, and resuming the media content item at the current position in the media content summary. At step 606, the media content item is resumed at the current position in the media content summary. Advantageously, this feature provides the user with greater control over their viewing experience. The user can choose to resume the media content at a current position in the media content summary, allowing them to skip parts of the media content that they may not be interested in, but begin resumption of the media content at a previously viewed section. This feature is particularly useful for long-form content or series where the user may want to skip certain episodes or scenes.

At step 608, a media content summary comprising a portion of the media content item after the pause point is generated. At step 610, the media content item is resumed after the pause point. Advantageously, these features allow the user to get a quick recap of the media content item after the pause point. The media content summary can include key events or character arcs that occurred after the pause point, helping the user to quickly catch up with the storyline. This is particularly useful for users who have paused their viewing for a long period of time and need a refresher on the plot.

FIG. 7 illustrates an exemplary flowchart of the processing involved in determining contextual factors for the generation of a media content summary, in accordance with examples of the disclosure. This process can be carried out by control circuitry or processing circuitry on the user device 816. One or more steps of Process 700 can be carried out in addition to, or in parallel to, steps of Process 500 or Process 600. Process 700 starts at step 702, step 704, or step 706.

At step 702, a detail level of the media content summary based on the user watch history is determined, and a length of the media content summary is based on the detail level. Advantageously, this feature allows the system to tailor the media content summary to the user's specific needs. By determining a detail level based on the user watch history, the system can adjust the length and depth of the media content summary. For example, if the user frequently pauses and resumes watching, the system may generate a more detailed summary to help them recall the plot. Conversely, if the user rarely pauses, the system may generate a shorter summary, focusing on the key events.

At 704, a watch history of the media content by at least one second user of a plurality of users is determined, wherein the watch history of the at least one second user comprises portions of the media content item that was skipped, wherein the media content summary is further based on the watch history of the at least one second user. Advantageously, this feature allows the system to leverage collective user behavior to enhance individual user experiences. By determining other user watch history, the system can identify portions of the media content item that are commonly skipped by other users. This information can be used to generate a media content summary that focuses on the most relevant and engaging parts of the media content item. This feature can help users to navigate long-form content or series more efficiently, enhancing their overall viewing experience.

At step 706, user preferences are determined, in turn for the determination and generation of the media content summary, and wherein the media content summary is further based on the user preferences. Advantageously, this feature allows the system to provide a more personalized viewing experience for the user. The user preferences can include factors such as the user's favorite characters, preferred plotlines, or preferred media formats. By considering these preferences in the determination and generation of the media content summary, the system can create a summary that is more relevant and engaging for the user. This feature leverages the principles of user profiling and personalization, which are well-established in the field of recommender systems and user experience design. By using these principles, the system can enhance user satisfaction and engagement with the media content item In some examples, the method of generating the media content summary comprises at least one type of media from video, images, audio, GIFs, cartoons, or text; and the user preferences comprise an indication of priority for the media content summary type. Advantageously, this feature provides the user with a more diverse and engaging viewing experience. As described above, the system can generate the media content summary using a variety of media types, including video, images, audio, GIFs, cartoons, or text. In some examples, this may be an overlay on an object/person/scene relevant to the media content summary. In some examples, the overlay may be selectable by a user. This allows the system to cater to the user's specific media preferences and consumption habits. For example, if the user prefers visual content, the system can prioritize video and images in the media content summary. This feature leverages the principles of multimedia content generation and delivery, which are well-established in the field of multimedia systems and user experience design. By using these principles, the system can enhance the richness and diversity of the media content summary, thereby improving the user's viewing experience and engagement.

In some examples, the method further comprises sending a notification to a user device, the notification comprising the pause duration and a selectable option to view the generated media content summary. Advantageously, this feature allows the system to proactively engage with the user and encourage them to resume watching the media content item. The notification can be sent to the user's device, providing them with information about the pause duration and offering them an option to view the media content summary. This feature leverages the principles of push notifications and user engagement, which are well-established in the field of mobile computing and user experience design. By using these principles, the system can increase the likelihood of the user resuming their viewing session, thereby enhancing user engagement with the media content item. In some examples, the media content summary may be sent to the user outside of the media content platform. For example, an email comprising the media content summary as an enticement to return to the media content platform for further consumption.

In some embodiments the method further comprises preloading a further media content item in parallel to the generation of the media content summary. Advantageously, this feature allows the system to provide a seamless and uninterrupted viewing experience for the user. While the system is generating the media content summary, it can also preload a further media content item. This means that as soon as the user finishes consuming the media content summary, they can immediately start watching the next media content item without any delay. This feature leverages the principles of parallel processing and buffering, which are well-established in the field of computer science and multimedia systems. By using these principles, the system can minimize loading times and enhance the overall viewing experience for the user.

It will be understood that the term "GIFs" as used herein may refer to a specific type of digital file format, typically used for short, looping animations or video clips, that are generated as part of the summary of the media content item.

It will be understood that the term "cartoons" as used herein may refer to a specific category of animated media content items, such as animated television shows or films, that are typically characterized by stylized, often humorous, visual representations.

It will be understood that the term "preloading" as used herein may refer to the process of loading a portion or all of a media content item into memory before it is accessed by the user, to ensure smooth playback or quick access when the user resumes viewing.

Figure 8:
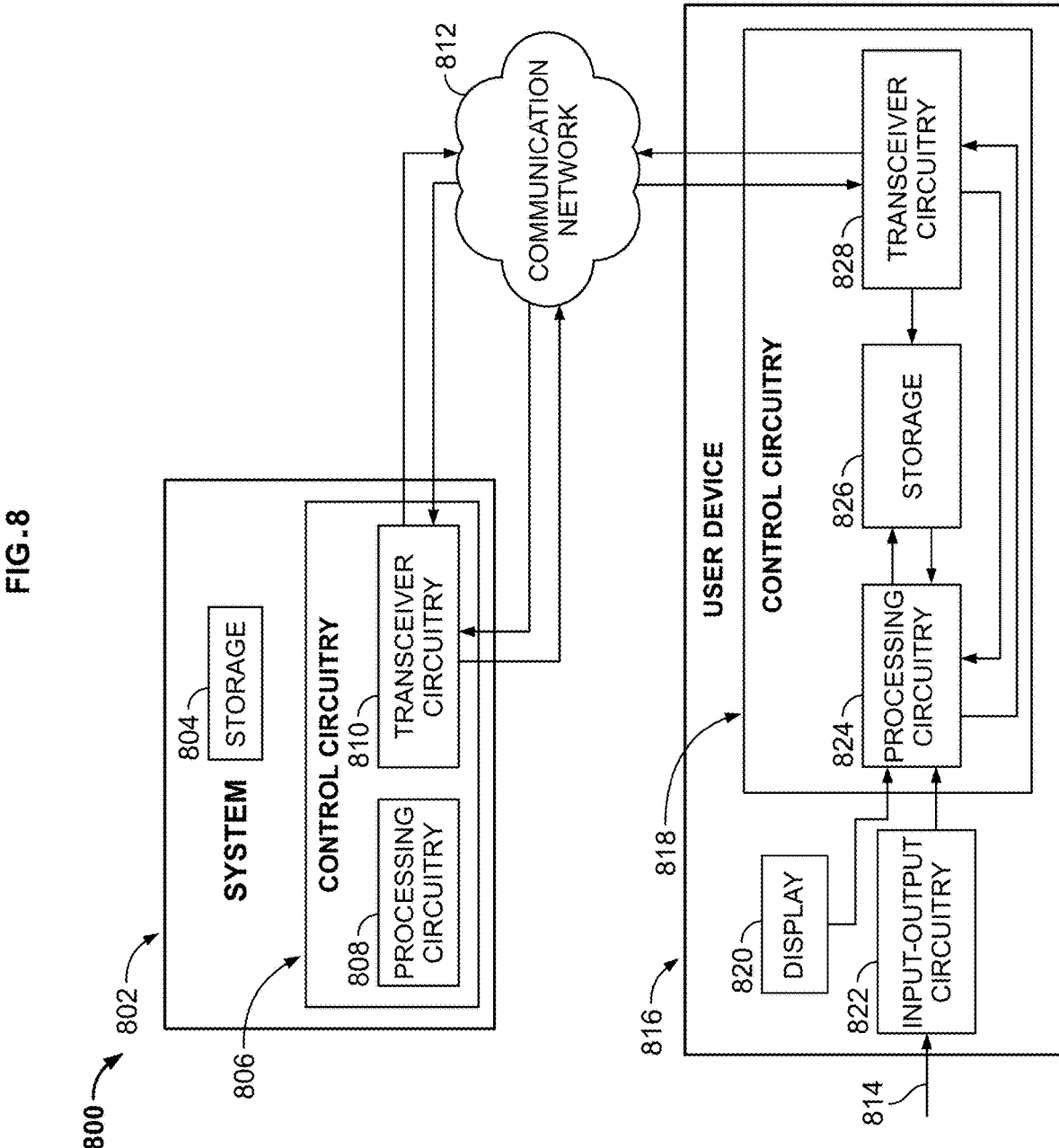
FIG. 8 illustrates a block diagram representing devices, components of each device, and data flow therebetween, in accordance with examples of the present disclosure.

FIG. 8 illustrates a block diagram 800 representing devices, components of each device, and data flow therebetween, in accordance with examples of the present disclosure.

The block diagram 800 is shown to include a user device 816 (or 102, 104), a system 802 (or 108), and a communication network 812. It is understood that while a single instance of a component may be shown and described relative to FIG. 8, additional instances of the component may be employed. For example, the system 802 may include or may be incorporated in, more than one server. Similarly, the communication network 812 may include or may be incorporated in, more than one communication network. The system 802 is shown communicatively coupled to the user device 816 through the communication network 812. While not shown in FIG. 8, the system 802 may be directly communicatively coupled to the user device 816, for example, in a system absent or bypassing the communication network 812.

The communication network 812 may comprise one or more network systems, such as, without limitation, an internet, Local Area Network (LAN), Wi-Fi, or other network systems suitable for audio processing applications. In some examples, the block diagram 800 excludes the system 802, and functionality that would otherwise be implemented by the system 802 is instead implemented by other components of the block diagram 800, such as one or more components of the communication network 812. In still other examples, the system 802 works in conjunction with one or more components of the communication network 812 to implement certain functionalities described herein in a distributed or cooperative manner. Similarly, in some examples, the block diagram 800 excludes the user device 816, and functionality that would otherwise be implemented by the user device 816 is instead implemented by other components of the block diagram 800, such as one or more components of the communication network 812 or the system 802 or a combination thereof. In still other examples, the user device 816 works in conjunction with one or more components of the communication network 812 or the system 802 to implement certain functionality described herein in a distributed or cooperative manner.

Referring to FIG. 8, the user device 816 includes control circuitry 818, display 820, and input-output circuitry 822. The control circuitry 818 in turn includes transceiver circuitry 828, storage 826, and processing circuitry 824.

The system 802 includes control circuitry 806 and storage 804. Each of the storages 804 and 826 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, Blu-Ray disc (BD) recorders, Blu-Ray 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 804, 826 may be used to store various types of objects, user preferences, 3D models, or other types of data. The non-volatile memory may also be used (e.g., to launch a boot-up routine and other instructions). Cloud-based storage may be used to supplement storages 802, 826 or instead of storages 802, 826.

In some examples, control circuitry 806 and/or 818 executes instructions for an application stored on the memory (e.g., storage 804 and/or storage 826). Specifically, control circuitry 806 and/or 818 may be instructed by the application to perform the functions discussed herein. In some implementations, any action performed by control circuitry 806 and/or 818 may be based on instructions received from the application. For example, the application may be implemented as software or a set of executable instructions that may be stored on storage 804 and/or 826 and executed by control circuitry 806 and/or 818. In some examples, the application may be a client/server application, where only a client application resides on user device 816, and a server application resides on system 802.

The application may be implemented using any suitable architecture. For example, it may be a stand-alone application wholly implemented on user device 816. In such an approach, instructions for the application are stored locally (e.g., in storage 826), and data for use by the application is downloaded periodically (e.g., from an out-of-band feed, from an Internet resource, or using another suitable approach). The control circuitry 818 may retrieve instructions for the application from storage 826 and process the instructions to perform the functionality described herein. Based on the processed instructions, control circuitry 818 may determine a type of action to perform in response to input received from the input/output path (or the input-output circuitry) 822 or the communication network 812. For example, in response to a maximum network bandwidth, control circuitry 818 may perform the steps of processes relative to various examples discussed herein.

In client/server-based examples, control circuitry 818 may include communication circuitry suitable for communicating with an application server (e.g., system 802) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 812). In another example of a client/server-based application, control circuitry 818 runs a web browser that interprets web pages provided by a remote server (e.g., system 802). For example, the remote server may store the instructions for the application in a storage device. The remote server may process the stored instructions using circuitry (e.g., control circuitry 818) and/or generate displays. The user device 816 may receive the displays generated by the remote server and may display the content of the displays locally via display 820. This way, the processing of the instructions is performed remotely (e.g., by system 802) while the resulting displays, such as the display windows described elsewhere herein, are provided locally on the user device 816. The user device 816 may receive inputs from the user via the input-output circuitry 822 and transmit those inputs to the remote server for processing and generating the corresponding displays. Alternatively, the user device 816 may receive inputs from the user via input-output circuitry 822 and process and display the received inputs locally, by control circuitry 818 and display 820, respectively.

System 802 and user device 816 may transmit and receive data such as via the communication network 812. The control circuitry 806, 818 may send and receive commands, requests, and other suitable data through communication network 812 using transceiver circuitry 810, 828, respectively. The control circuitry 806, 818 may communicate directly with each other using transceiver circuitry 810, 828, respectively, avoiding communication network 812.

The control circuitry 806 and/or 818 may be based on any suitable processing circuitry such as processing circuitry 808 and/or 824, respectively. As referred to herein, processing circuitry 808 and/or 824 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry 808 and/or 824 may be distributed across multiple separate processors, for example, multiple of the same type of processors (e.g., two Intel Core i9 processors) or multiple different processors (e.g., an Intel Core i7 processor and an Intel Core i9 processor).

The user device 816 receives a user input 814 at the input-output circuitry 822. For example, user device 816 may receive a selection of an object by a gesture like a user swipe or user touch, as previously discussed.

User input 814 may be received from a user selection-capturing interface that is separate from user device 816, such as a remote-control device, trackpad, or any other suitable user movement sensitive or capture devices, or as part of user device 816, such as a touchscreen of display 820. Transmission of user input 814 to user device 816 may be accomplished using a wired connection, such as an audio cable, USB cable, Ethernet cable, or the like attached to a corresponding input port at a local device, or may be accomplished using a wireless connection, such as Bluetooth, Wi-Fi, WiMAX, Zigbee, GSM, UTMS, CDMA, TDMA, 3G, 4G, 4G LTE, 5G, or any other suitable wireless transmission protocol. Input circuitry 822 may comprise a physical input port such as a 3.5 mm audio jack, RCA audio jack, USB port, Ethernet port, or any other suitable connection for receiving audio over a wired connection, or may comprise a wireless receiver configured to receive data via Bluetooth, Wi-Fi, WiMAX, Zigbee, GSM, UTMS, CDMA, TDMA, 3G, 4G, 4G LTE, 5G, or other wireless transmission protocols.

Processing circuitry 824 may receive user input 814 from input-output circuitry 822. Processing circuitry 824 may convert or translate the received user input 814 that may be in the form of gestures or movement to digital signals. In some examples, input-output circuitry 822 performs the translation to digital signals. In some examples, processing circuitry 824 (or processing circuitry 808, as the case may be) carries out disclosed processes and methods.

In some examples, the methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor (such as 202) to perform or control the performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein and may store instructions which may be performed or executed by the systems described herein. Furthermore, it is contemplated that the CRSMs described herein may store instructions different than those corresponding to the methods described herein and may store instructions which may be performed by systems other than the systems described herein.

The methods, systems, and CRSMs described herein may include the features or perform the functions described herein in association with any one or more of the other methods, systems, and CRSMs described herein.

In some examples, the method or methods described above may be executed or carried out by a computing system including a tangible computer-readable storage medium, also described herein as a storage machine, that holds machine-readable instructions executable by a logic machine (e.g., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption.

The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an Application Programming Interface (API).

Figure 9:
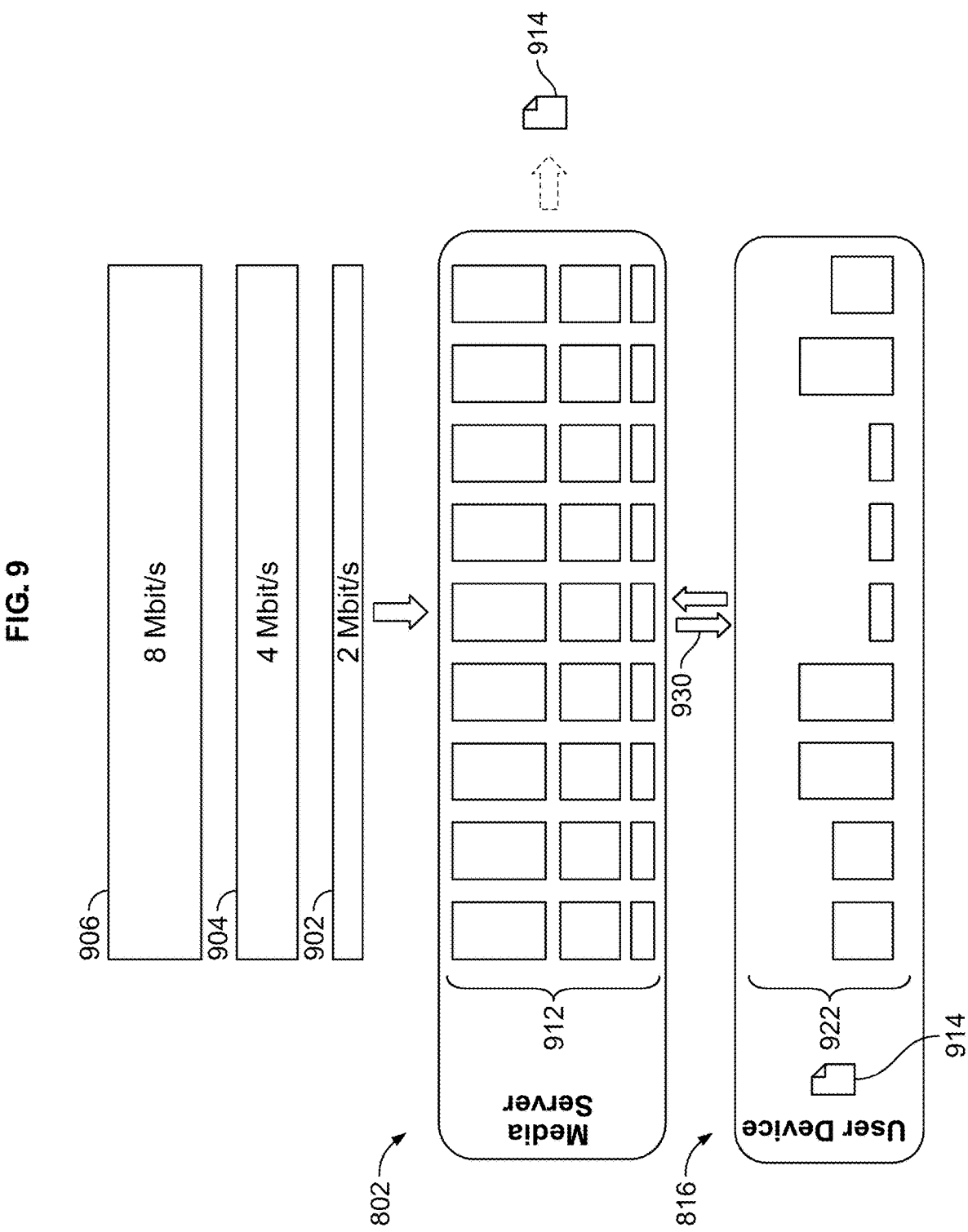
FIG. 9 is a pictorial representation of a manifest for adaptive bitrate content, in accordance with examples of the disclosure.

FIG. 9 is a pictorial representation of a manifest for adaptive bitrate content, in accordance with examples of the disclosure. A first bitrate variant 902, a second bitrate variant 904, and a third bitrate variant 906 are shown as 2 Mbit/s (2 megabits per second), 4 Mbit/s, and 8 Mbit/s, respectively. However, it should be understood that any suitable value of bitrates may be used and there may be more or fewer bitrate variants available for any content (e.g., values greater than 8 Mbit/s). In addition, there may also be intermediate bitrate values (e.g., 3.5 Mbit/s).

In some examples, the Media Server 802 (also shown in FIG. 8), and system 108 (shown in FIG. 1) separate the first bitrate variant 902, second bitrate variant 904, and third bitrate variant 906 into a plurality of segments 912. Put another way, media content is split into smaller segments, and transcoded into multiple representations in different bitrates, resolutions, or frame rates. In some examples, the segment size is determined by the seconds of content to be consumed. However, in other examples, the segment size can be determined by a number of frames, the cache size of the user device, the length of a segment (in seconds), or the amount of data to be transmitted (i.e., a segment size limit). The plurality of segments 912 are encoded with resolutions ranging from, for example, 360p to 2160p and various quality levels using adaptive bitrate streaming compatible codecs and resolutions for adaptive video streaming formats. In some examples, the lowest bitrate variants are text, hyperlinked text, or a still image. In some examples, the highest bitrate variants are large video formats and high-quality audio. In some examples, each of the bitrate variants is separated by a minimum delta megabit per second (Mbps), for example, 1 Mbps or 2 Mbps.

In some examples, a master playlist 914 containing URLs to each of the plurality of segments 912 is outputted and transmitted from the media server 802 to the user device 816 (also shown in FIG. 8) as a manifest that describes the available stream segments of an adaptive video stream and their respective bitrate variants to a user device 830. Which bitrate variant the user device chooses can be changed from second to second or segment to segment. For example, if a user's available bandwidth changes, the user device 830 can select a different bitrate variant (i.e., a different video quality) to match the available bandwidth.

In some examples, the media server 802 may determine the complexity of the segment, a plurality of segments (e.g., a plurality of media content items), a number of frames, or an amount of data to be transmitted (e.g., a segment size). In some examples, when the media server 802 outputs the master playlist 914, such as a manifest, the media server can create an indication of the complexity of each of the segments, scenes, media content items, or frames. In some examples, the present disclosure proposes adding into the header or other segments of the manifest file represented by master playlist 914 metadata related to the contextual information for each of the plurality of segments 912.

In some examples, the segments as described with reference to FIG. 9 are segments of a plurality of segments of an adaptive bitrate stream (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

In some examples, the bandwidth available to user device 816 falls between two bitrate variants. For example, if the user device has an available bandwidth of 6 Mbit/s, this would fall between the recommend minimum bandwidth requirement for second bitrate variant 904 and third bitrate variant 906. Therefore, in such situations, it would be desirable to request some segments of the adaptive bitrate stream at the third bitrate variant 906 and some segments at the second bitrate variant 904, in such a way that the average bandwidth required is 6 Mbit/s or less (the maximum available at the user device 816).

The frequency of media content being paused can vary greatly depending on the context. For example, in the context of web development, the HTMLMediaElement-.paused property can be used to determine whether a media element is paused at any given moment. During personal use, individuals might choose to take a break from media content (i.e., a TV show, movie, or social media) for various reasons, as mentioned above. The pause event is sent when a request to pause an activity is handled and the activity has entered its paused state, most commonly after the media has been paused through a call to the element's pause ( ) method. During a pause event, a tag in the manifest file 914 can be identified and data regarding the URL for the visual effect, or simply the context, can be used to apply a visual effect to the media content.

In addition, during the pause event, later segments of the manifest file 914 can be downloaded in a higher quality, if the user's bandwidth allows. In this way, segments can be continued to be stored in cache in parallel to displaying a visual effect.

The media server 802, or system 108, provides the content stored thereon to a plurality of users. User devices, such as user device 816, that support adaptive bitrate streaming (e.g., DASH or HLS), need to monitor the available bandwidth to determine at what bitrate to request segments (e.g., a media content item) of the requested media content from the media server 1230. In conventional systems, it is just the bandwidth that influences the determination of what bitrate to request.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

All the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The disclosure is not restricted to the details of any foregoing examples. The disclosure extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of resuming a media content item, the method comprising:

receiving, using control circuitry, a request to resume playing a media content item;

determining, using the control circuitry, user watch history of the media content item, wherein the user watch history comprises data indicative of a pause point, a pause duration and a frequency of past user inputs that paused and re-initiated playing of the media content item, wherein the pause duration defines the time elapsed between the pause point and the request to resume playing the media content item;

generating, using the control circuitry, a media content summary, wherein a detail and length of the media content summary is based, at least in part, on: (a) the length of the pause duration, and (b) the frequency of the past user inputs that paused and re-initiated playing of the media content item indicated by the user watch history; and providing, using the control circuitry, the media content summary for consumption by a user.

2. The method of claim 1, further comprising:

in response to the user consuming the media content summary, resuming the media content item at or after the pause point.

3. The method of claim 1, further comprising:

during the user consumption of the media content summary, receiving, using control circuitry, a user selection to resume the media content item at a current position in the media content summary; and resuming the media content item at the current position in the media content summary.

4. The method of claim 1, further comprising:

determining a detail level of the media content summary based on the user watch history; and wherein a length of the media content summary is based on the detail level.

5. The method of claim 1, further comprising:

determining a watch history of the media content by at least one second user of a plurality of users, wherein the watch history of the at least one second user comprises portions of the media content item that was skipped; and wherein the media content summary is further based on the watch history of the at least one second user.

6. The method of claim 1, further comprising:

determining user preferences for the determination of user watch history and the generation of the media content summary; and wherein the media content summary is further based on the user preferences.

7. The method of claim 6, wherein generating the media content summary comprises at least one type of media from: video, images, audio, GIFs, cartoons, or text; and wherein the user preferences comprise an indication of priority for the media content summary type.

8. The method of claim 1, further comprising:

sending a notification to a user device, the notification comprising the pause duration and a selectable option to view the generated media content summary.

9. The method of claim 1, wherein the media content item comprises a media series.

10. The method of claim 1, wherein generating, using control circuitry, the media content summary comprises:

calculating a memory retention value, wherein the pause duration is a variable of the calculation;

determining the length of the media content summary, based, at least in part, on the memory retention value, wherein an increase in the pause duration causes an increase in the length of the media content summary.

11. A system comprising control circuitry, the control circuitry configured to:

receive request to resume playing a media content item;

determine user watch history of the media content item, wherein the user watch history comprises data indicative of a pause point, a pause duration and a frequency of past user inputs that paused and re-initiated playing of the media content item, wherein the pause duration defines the time elapsed between the pause point and the request to resume playing the media content item;

generate a media content summary, wherein a detail and length of the media content summary is based, at least in part, on (a) the length of the pause duration and (b) the frequency of the past user inputs that paused and re-initiated playing of the media content item indicated by the user watch history; and provide the media content summary for consumption by a user.

12. The system of claim 11, the control circuitry further configured to:

in response to the user consuming the media content summary, resume the media content item at or after the pause point.

13. The system of claim 11, the control circuitry further configured to:

during the user consumption of the media content summary, receive a user selection to resume the media content item at a current position in the media content summary; and resume the media content item at the current position in the media content summary.

14. The system of claim 11, the control circuitry further configured to:

determine a detail level of the media content summary based on the user watch history; and wherein a length of the media content summary is based on the detail level.

15. The system of claim 11, the control circuitry further configured to:

determine a watch history of the media content by at least one second user of a plurality of users, wherein the watch history of the at least one second user comprises portions of the media content item that was skipped; and wherein the media content summary is further based on the watch history of the at least one second user.

16. The system of claim 11, the control circuitry further configured to:

determine user preferences for the determination of user watch history and generation of the media content summary; and wherein the media content summary is further based on the user preferences.

17. The system of claim 16, wherein generating the media content summary comprises at least one type of media from: video, images, audio, GIFs, cartoons, or text; and wherein the user preferences comprise an indication of priority for the media content summary type.

18. The system of claim 11, the control circuitry further configured to:

send a notification to a user device, the notification comprising the pause duration and a selectable option to view the generated media content summary.

19. The system of claim 11, wherein the media content item comprises a media series.

20. The system of claim 11, wherein the control circuitry is configured to generate the media content summary by:

calculating a memory retention value, wherein the pause duration is a variable of the calculation;

determining the length of the media content summary, based, at least in part, on the memory retention value, wherein an increase in the pause duration causes an increase in the length of the media content summary.

\*   \*   \*   \*   \*